Figure 1:
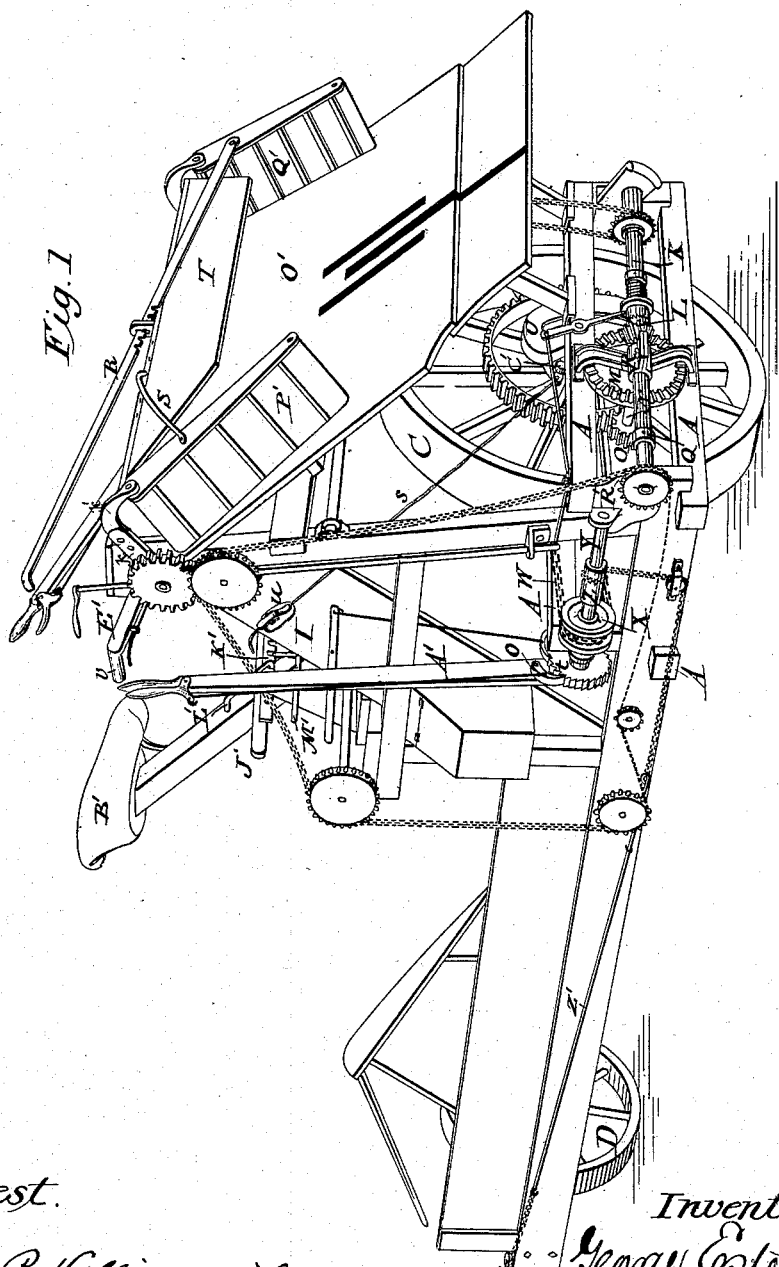

(No Model.) 2 Sheets—Sheet 1.

G. ESTERLY.
GRAIN HARVESTING MACHINE.

No. 262,026. Patented Aug. 1, 1882.

Attest.
Sidney P. Hollingsworth
Newton Wyckoff.

Inventor.
George Esterly
By his Atty
Philip T. Dodge.

(No Model.) 2 Sheets—Sheet 2.
G. ESTERLY.
GRAIN HARVESTING MACHINE.
No. 262,026. Patented Aug. 1, 1882.
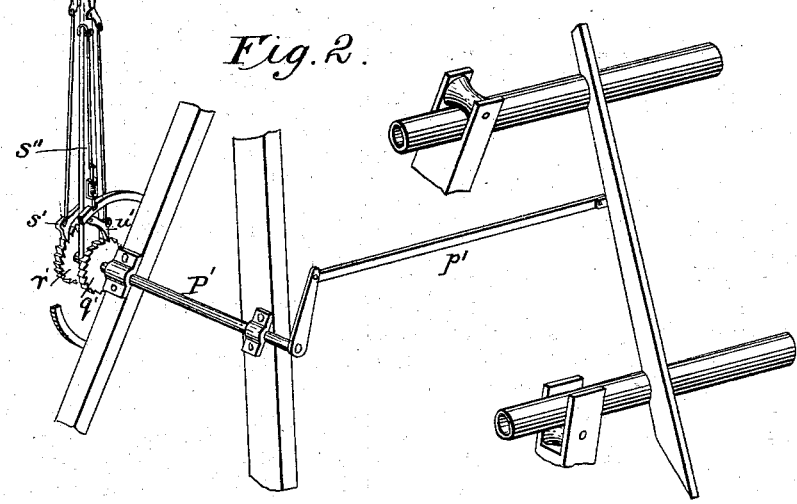
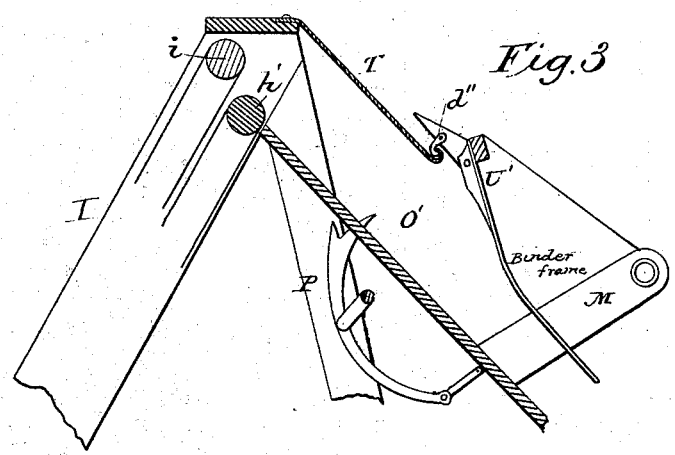
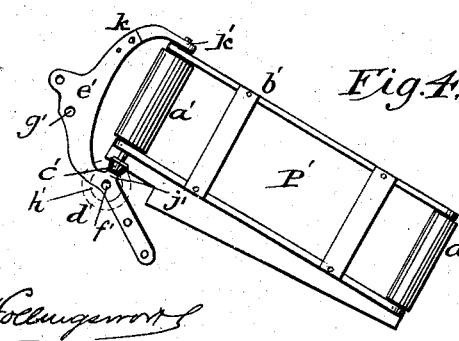
Attest,
Sidney P. Hollingsworth
Newton Wyckoff
Inventor.
George Esterly
By his Attorney
Philip T. Dodge

UNITED STATES PATENT OFFICE.

GEORGE ESTERLY, OF WHITEWATER, WISCONSIN.

GRAIN-HARVESTING MACHINE.

SPECIFICATION forming part of Letters Patent No. 262,026, dated August 1, 1882.

Application filed April 3, 1882. (No model.)

*To all whom it may concern:*

Be it known that I, GEORGE ESTERLY, of Whitewater, in the county of Walworth and State of Wisconsin, have invented certain Improvements in Grain Harvesters and Binders, of which the following is a specification.

This invention has reference more particularly to that class of combined harvesting and binding machines wherein the cut grain is elevated from the harvester-platform over the main wheel and delivered in a downward direction upon the table or receiver, where it is bound by the action of automatic devices.

The first part of the invention consists in combining with the surface over which the grain passes to the binding mechanism two vertical endless belts located at opposite ends of the table and adjustable horizontally at their lower ends, for the purpose of acting upon the ends of the grain and delivering the same in a proper manner and form to the binding devices.

Another feature of the invention consists in combining with the harvester and binder-frame an overhead plate, commonly denominated a "deck," attached at one end to the elevator-frame and at the opposite end to the binder-frame, for the purpose of holding the grain down in proper position to be acted upon by the feeding and binding mechanism.

Another feature of the invention consists in peculiar standards adapted to sustain the bearings of the upright rolls which carry the upper ends of the grain-adjusting belts or aprons, and also adapted to receive the journal of the upper elevator-roll. These standards are made with detachable ends to facilitate the removal of the upright adjuster-rolls, this detachable end forming the only feature of novelty claimed herein. As regards the standards, broadly considered, they have been made the subject of a separate application, and are not claimed as of the present invention.

Referring to the accompanying drawings, Figure 1 is a perspective view of my improved machine. Fig. 2 is a view of the means for shifting the binder-frame upon the harvester. Fig. 3 is a vertical section through the binding-table and elevator with the shield or deck above the table. Fig. 4 is a side view, showing the manner in which the small belts operating on the end of the grain are sustained.

In the accompanying drawings I have illustrated my improvements applied to what is commonly known in the art as the "Esterly Harvester"—a machine similar in its main features to many others of its class, the machine consisting of a horizontal main frame, A, provided on one side with a horizontal grain-receiving platform sustained at its inner and outer ends, respectively, by means of the traction-wheels C and D. The knife or devices E, by which the grain is cut, are located, as usual, at the front of the platform, as shown. Upon the main frame A there is erected, as usual, an upright elevator-frame, containing two endless elevating belts or aprons, commonly known in the art as "canvases." These belts are sustained at the upper and lower ends of the elevator-frame upon horizontal rolls mounted in the upright frame, as usual. These features form no part of the present invention. On the outer side of the elevator-frame, at or near the top, there is located an inclined board or table, O', commonly known as a "binding-table," upon which the grain is delivered from the upper ends of the elevator-belts. In connection with this table I arrange in any suitable manner any approved form of grain-binding devices adapted to encircle the gavels upon the table with the binding material, fasten the same, and then discharge the bound bundles. I prefer to employ the form of binding mechanism which is sustained mainly by an overhanging arm of the standard M above the table. The preferred type of machine is the modification of the well-known Appleby machine, represented in my application for Letters Patent No. 56,726, March 29, 1882, to which application reference is made for a detailed description and illustration of the binder and its arrangement in relation to the binding-table.

In order to secure the delivery of the grain to the binding devices in such manner as to cause the application of the band at the middle of the grain regardless of its length, I make use of two approximately-vertical endless belts or aprons, P' and Q', located upon opposite ends of the binding-table or grain-receiving board, as shown in Fig. 1, for the purpose of acting upon the ends of the grain and shifting the same endwise, as may be required. These belts are each sustained by approximately-vertical rolls $a'$ and $a''$, located in opposite ends of a frame, $b'$, which frame is sustained by and arranged to swing around the journals of the roll $a'$, this arrangement permitting the lower ends of the frames carrying the belts to be moved horizontally, so that their surfaces will lie at a greater or less angle to the path of the descending grain. The two belts are adjustable independently of each other, so that the space between their lower ends may be varied to suit the length of the grain upon which the machine operates. By properly adjusting the belts the machine is adapted not only to render the ends of the gavel smooth and even, but also to deliver the grain, whether long or short, at any required point upon the table, and to move the grain forward upon the table with equal speed at the two ends, so that it is prevented from swinging laterally or assuming an oblique position upon the table, as it would otherwise be liable to do.

I am aware that it is old to employ stationary adjustable inclined boards at opposite ends of a grain-table to effect the longitudinal adjustment of the grain; but my arrangement of belts differs therefrom in the important particular that the belts control both the longitudinal and the lateral movement of the grain. The belts secure under all circumstances the delivery of the grain squarely and properly to the binding devices. The oblique boards have no such effect.

In order that the attendant may readily adjust the belts as required while occupying his seat upon the machine, I connect with the frame of the forward belt, $Q'$, a rod or bar, $R$, extended backward within reach of the driver, and provided near its middle with a series of notches arranged to interlock with a guiding plate or stud upon the main frame. I also connect to the frame of the rear belt, $P'$, a rod, $S$, having a hooked upper end, which may be engaged in one or another of a series of holes formed in the top of the elevator-frame at the will of the operator.

Each of the rolls $a'$ is provided on its lower end with a beveled driving-pinion, $c'$, which receives motion from a pinion, $d'$, mounted on the journal of the elevator-roll $h'$, as shown in Figs. 3 and 4. It should be understood that although the drawings show but one of the pinions $d'$, the elevator-roll is provided with two pinions located at opposite ends, one for each of the adjusting-belts.

For the purpose of properly sustaining the rolls $a'$ and of preventing the disengagement of the pinions $c'$ and $d'$, I employ the standards or brackets $e'$, represented in Figs. 1 and 4. These brackets consist each of a base portion adapted to be bolted to the side of the elevator-frame, with bearings $f'$ and $g'$ therein to receive the journals of the two elevator-rolls, and also provided with a bearing to receive the lower journal of the rolls $a'$, and of an upright arm, $k$, forming at its upper end a bearing for the upper journal of the roll $a'$. It will be seen that the standard $e'$ thus serves as a bearing for both the elevator-rolls, and also as a bearing for both journals of the roll $a'$, all of which parts are thus held securely in proper relations to each other. In order to facilitate the removal of the adjusting-belts and their adjuncts, each standard has its upper end, $k'$, made a separate piece from the remainder and bolted thereto, so that it may be readily disconnected when desired. It will of course be understood that when the base portion and the upper end are bolted together they form in effect a single rigid standard. When this end is disconnected it will be seen that the frame $b'$, together with the aprons and supporting-rolls, may be instantly removed. This detachability of the upper end is the only feature claimed as of the present invention.

For the purpose of delivering the grain in a positive manner to the binding mechanism and subjecting it to the required compression, I make use of what are commonly known as "packer-arms," such as represented in my application before referred to. These packer-arms are located beneath the binding-table, as shown at P, Fig. 3, and, ascending intermittently through the same, serve to force the grain downward beneath the binding devices.

In the practical operations of the machine great trouble has arisen, because the mass of grain accumulating upon the table rises over the top of the binding mechanism and fails to pass properly to the packing devices. To avoid this trouble, and also to serve as wind-guards, sheet-metal shields, commonly known as "decks," have been secured to the elevator-frame and extended downward above the binding-table to rest on top of the grain, the shields being left free and disconnected at the lower ends. These shields yield under the pressure of the grain and fail to answer the desired end. I therefore extend the shield T, attached to the harvester as usual, downward, as shown in Fig. 3, and attach the lower edge to the top of the binder-frame $U'$ or other equivalent device connected with the binder, whereby it is held down securely in place. When the binder is stationary upon the harvester the shield may be bolted firmly to the binder; but if the binder be arranged, as usual, to slide on the harvester the shield will be connected to the binder by any suitable sliding joint. A simple construction is that shown in Fig. 3, in which the lower edge of the shield T is curled upward to form a lip, which engages with a hooked clasp, $d''$, on the binder. It will be seen that a shield applied as above will serve to keep the grain as it is delivered down upon the binding-table in such manner that it will be engaged by the packer-arms P and compelled to pass into the binder.

The binder-frame is made movable forward and backward on the harvester, as usual. For effecting this movement I employ the devices represented in Fig. 2, which will be made the subject of a separate application.

The present invention is restricted to those matters and things which are specifically claimed herein, and as regards all other features which may be described and shown, particularly the arrangement of devices for shifting the binder-frame endwise, the right is reserved to make the same the subject of a separate application.

Having thus described my invention, what I claim is—

1. In a combined harvester and binder, the combination of a grain-receiving table, O, and two adjustable endless belts, P' and Q', located upon opposite ends of said table to act upon the ends of the grain, substantially as described and shown, whereby a longitudinal adjustment of the grain may be effected and the grain prevented from assuming an oblique position across the table.

2. In a combined harvester and binder, the combination, with the binding-table, of two endless swinging belts located at opposite ends of said table, and means, substantially as described, whereby the lower ends of said belts may be adjusted transversely of the table at will, independently of each other, whereby the grain may be adjusted longitudinally and also adjusted transversely at either end independently of the other.

3. The bracket for sustaining the upper end of the grain-adjuster, constructed, as shown, with bearings for the journals of the adjuster-roll $a'$, and with the removable upper end, as described and shown, to permit the ready removal of said adjuster-roll.

4. In a grain harvesting and binding machine, the combination, with the grain-elevator and the binding-machine, of the intermediate deck or apron secured at its upper end to the elevator-frame and at its lower end to the binder-frame, substantially as described and shown, whereby the deck is held down in position against the pressure of the inflowing grain.

5. In combination with the harvester-frame and the adjustable binder-frame, the intermediate deck or apron secured rigidly to the elevator-frame and connected with the binder-frame by a sliding connection, substantially as described and shown.

GEORGE ESTERLY.

Witnesses:
W. C. DUVALL,
PHILIP T. DODGE.